(12) United States Patent
Kleber et al.

(10) Patent No.: US 9,397,539 B2
(45) Date of Patent: Jul. 19, 2016

(54) METHOD FOR FABRICATING A ROTOR FOR AN INDUCTION MOTOR

(75) Inventors: Richard M. Kleber, Clarkston, MI (US); John S. Agapiou, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 996 days.

(21) Appl. No.: 12/977,120

(22) Filed: Dec. 23, 2010

(65) Prior Publication Data

US 2012/0159772 A1 Jun. 28, 2012

(51) Int. Cl.
*H02K 15/02* (2006.01)
*H02K 15/00* (2006.01)

(52) U.S. Cl.
CPC ....... *H02K 15/0012* (2013.01); *Y10T 29/49009* (2015.01); *Y10T 29/49012* (2015.01)

(58) Field of Classification Search
CPC . H02K 15/0012; H02K 17/16; H02K 17/165; H02K 17/205; Y10T 29/49012
USPC ............................................ 29/598; 310/211
See application file for complete search history.

(56) References Cited

U.S. PATENT DOCUMENTS

| | | | | |
|---|---|---|---|---|
| 1,584,253 A | * | 5/1926 | Tanner | 310/212 |
| 1,936,244 A | * | 11/1933 | Bergstrom | 310/211 |
| 2,310,841 A | * | 2/1943 | Curtis | 269/41 |
| 4,777,396 A | | 10/1988 | Ito et al. | |
| 4,970,424 A | | 11/1990 | Nakamura et al. | |
| 5,861,700 A | | 1/1999 | Kim | |
| 6,088,906 A | * | 7/2000 | Hsu et al. | 310/211 |
| 6,159,305 A | * | 12/2000 | Kliman et al. | 148/112 |

FOREIGN PATENT DOCUMENTS

| | | |
|---|---|---|
| DE | 2362195 | 12/1973 |
| DE | 69308123 T2 | 6/1993 |
| DE | 19542962 C1 * | 11/1996 |
| DE | 102009018951 A1 | 11/2010 |
| EP | 0744813 A2 | 11/1996 |
| GB | 112288 A * | 1/1918 |

OTHER PUBLICATIONS

Machine translation of DE19542962, obtained Aug. 24, 2014.*
Power, Mar. 7, 1911, Hill Publishing Company, vol. 33, pp. 380-383.*
U.S. Appl. No. 12/791,184, filed Jun. 1, 2010, Kleber.
U.S. Appl. No. 12/791,009, filed Jun. 1, 2010, Kleber.

* cited by examiner

*Primary Examiner* — Livius R Cazan

(57) ABSTRACT

A method for fabricating a rotor assembly includes assembling shorting end rings onto conductor bars through a steel laminate stack. The ends of the steel laminate stack are immersed into a bath containing molten metal.

16 Claims, 2 Drawing Sheets

METHOD FOR FABRICATING A ROTOR FOR AN INDUCTION MOTOR

TECHNICAL FIELD

This disclosure is related to rotors for induction motors.

BACKGROUND

The statements in this section merely provide background information related to the present disclosure and may not constitute prior art.

An electric-powered induction motor transforms electric power to mechanical torque by inducing rotating magnetic fields between a static element, i.e., a stator, and a rotatable element, i.e., a rotor. The rotating magnetic fields generate torque on a shaft coupled to the rotor through conductor bars. Known stators induce current flows through conductor bars on the rotor that are preferably parallel to an axis of rotation of the rotor.

A known rotor for an induction motor includes a stack of steel sheets assembled onto a rotatable shaft, and a plurality of conductor bars fabricated from conductive material, e.g., copper or aluminum. The conductor bars are preferably connected at both axial ends of the rotors using shorting end rings.

Known rotor fabrication methods include assembling the laminated steel stack with conductor bars on an outer periphery of the rotor and shorting end rings on the ends thereof. This may include placing the laminated steel stack into a casting mold. Molten material is introduced into open spaces formed in the rotor and open spaces between the die cast mold and the laminated steel stack to form the shorting end rings and conductor bars. It is known that oxide inclusions and voids may be formed in the conductor bars and shorting end rings during mold filling of molten material and solidification. The molten material may cool and partially solidify during turbulent flow of the molten material into the plurality of conductor bar grooves due in part to exposure to surface areas of the conductor bar grooves. The partially solidified molten material may impede molten material flow and cause voids, oxide inclusions, and other discontinuities in the conductor bars and the shorting end rings.

Power density output from an electric induction motor correlates to quality of the conductor bars and mass bulk density of the individual conductor bars. It is known that voids formed in the conductor bars and the shorting end rings during fabrication reduce power density output of the electric induction motor. The presence of oxide inclusions and cracks due to hot tearing reduces the electric conductivity of the conductor bars and shorting end rings.

The use of copper material for conductor bars and/or shorting end rings may increase power density and heat transfer characteristics of an induction motor as compared to an induction motor using aluminum conductor bars and aluminum shorting end rings. Known use of copper material for conductor bars and shorting end rings increases manufacturing process times and complexity as compared to aluminum conductor bars. Known manufacturing processes for joining conductor bars and shorting end rings include casting and welding.

SUMMARY

A method for fabricating a rotor assembly for an induction motor includes assembling first and second shorting end rings onto a plurality of conductor bars of a steel laminate stack. The first and second shorting end rings each includes a plurality of grooves aligned with corresponding first portions of the conductor bars extending from a first end of the steel laminate stack and corresponding second portions of the conductor bars extending from a second end of the steel laminate stack. The corresponding first portions of the conductor bars are inserted into the grooves of the first shorting end ring and the corresponding second portions of the conductor bars are inserted into the grooves of the second shorting end ring. The first and second ends of the steel laminate stack, including the assembled first and second shorting end rings, are immersed into a bath containing molten metal.

BRIEF DESCRIPTION OF THE DRAWINGS

One or more embodiments will now be described, by way of example, with reference to the accompanying drawings, in which.

DETAILED DESCRIPTION

Figure 1:
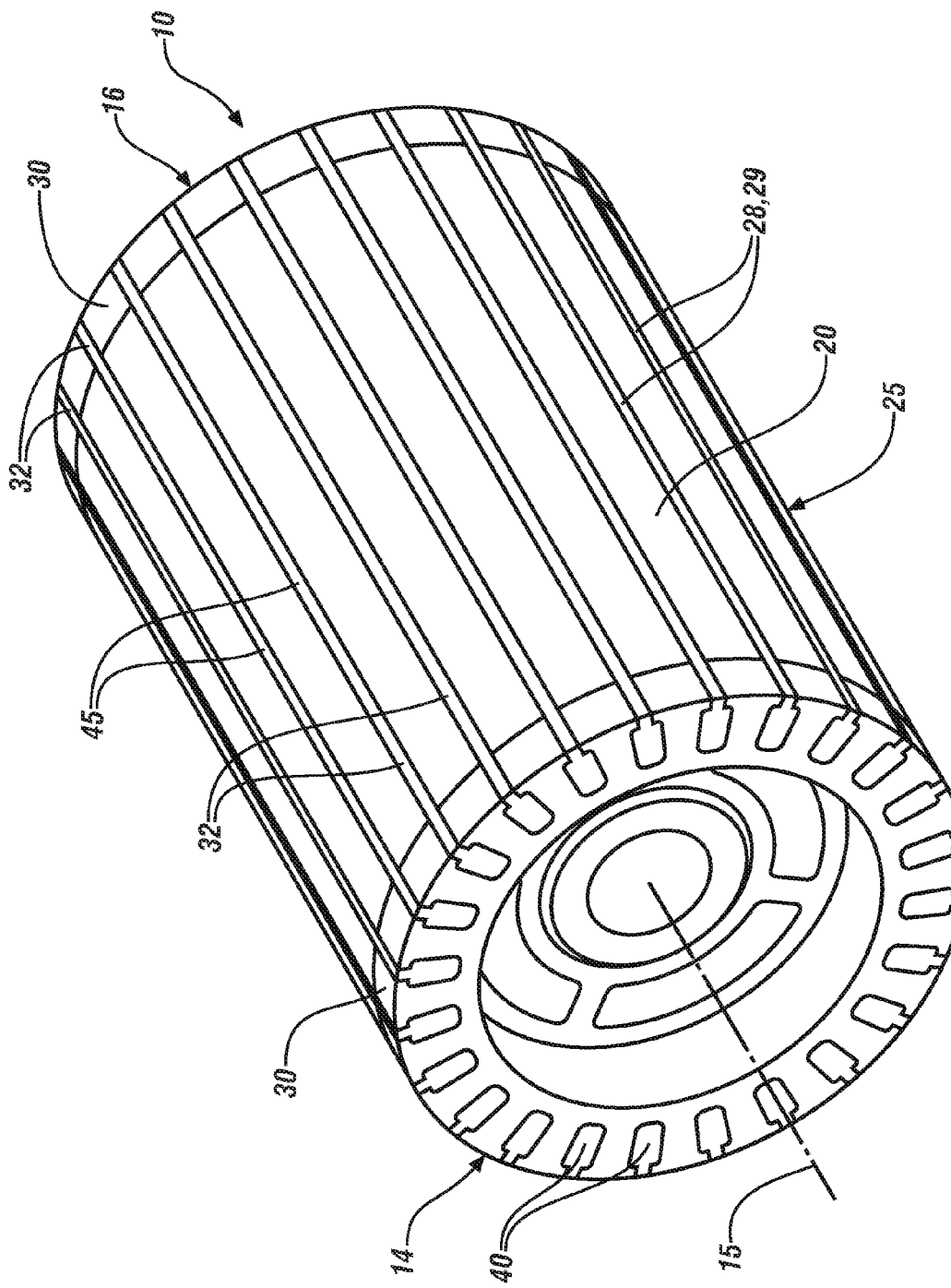
FIG. 1 is an isometric view illustrating a rotor assembly for an induction motor, in accordance with the disclosure.
Figure 2:
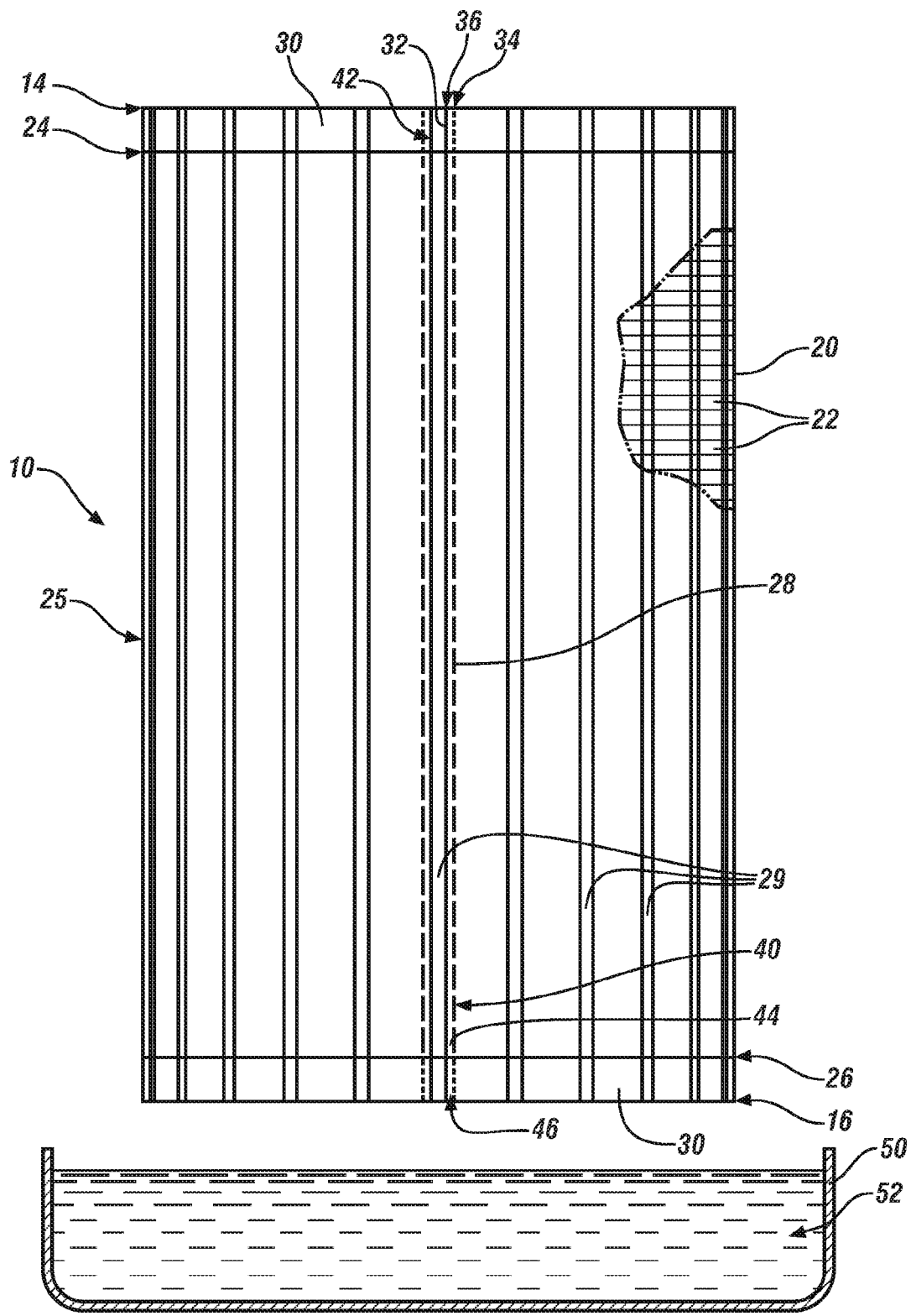
FIG. 2 is a two-dimensional side view schematically illustrating a rotor assembly for an induction motor and a molten metal bath, in accordance with the disclosure.

Referring now to the drawings, wherein the showings are for the purpose of illustrating certain exemplary embodiments only and not for the purpose of limiting the same, FIGS. 1 and 2 illustrate a rotor assembly 10 for an induction motor. The induction motor may be any induction motor, including an induction motor for use on a powertrain system for a motor vehicle. The rotor assembly 10 is fixedly attached to an axis of rotation 15 using any suitable device. It is appreciated that the rotor assembly 10 may be assembled onto a rotatable axle element subsequent to rotor assembly.

The rotor assembly 10 includes a first end 14 and a second end 16. The rotor assembly 10 is configured to be assembled into and rotate within a stator of an induction motor.

The rotor assembly 10 includes an assembled steel laminate stack 20 and a plurality of radially-oriented conductor bars 40 electrically connected to annular-shaped shorting end rings 30 that are assembled onto each of first and second ends 24 and 26, respectively, of the steel laminate stack 20. The first end 24 of the steel laminate stack 20 corresponds to the first end 14 of the rotor assembly 10 and the second end 26 of the steel laminate stack 20 corresponds to the second end 16 of the rotor assembly 10.

The steel laminate stack 20 is fabricated from a plurality of thin laminate sheets 22 formed from ferric material. In one embodiment the laminate sheets 22 are 0.33 mm (0.013 inches) thick. The laminate sheets 22 are stamped using a fine blanking process and are preferably electrically insulated to minimize eddy currents. Each laminate sheet 22 is a flat annular-shaped device and includes a plurality of radially-oriented apertures formed near an outer periphery thereof. When the laminate sheets 22 are assembled into the steel laminate stack 20, the radially-oriented apertures are aligned to form grooves 28 that are parallel with the axis of rotation 15 and are radially-oriented near an outer periphery 25 of the steel laminate stack 20. The grooves 28 may have any suitable cross-sectional shape, and are substantially rectangular-shaped in one embodiment. The grooves 28 include open portions 29 on the periphery 25. The radially-oriented grooves 28 and associated open portions 29 are equally spaced around the periphery 25. The grooves 28 accommodate conductor bars 40. The laminate sheets 22 are assembled onto the axis of rotation 15 in a laminated fashion using any suitable fabricating method.

The conductor bars 40 are preferably fabricated from copper-based materials and are formed in each of the grooves 28 by any suitable process, including, e.g., insertion or molding. Alternatively, the conductor bars 40 may be fabricated from aluminum-based materials. Each conductor bar 40 includes a first portion 42, a main portion 44, and a second portion 46, and each has a peripheral edge 45. The first portion 42 projects laterally beyond the first end 24 of the steel laminate stack 20. The second portion 46 projects laterally beyond the second end 26 of the steel laminate stack 20. The main portion 44 is contained within the grooves 28 formed in the steel laminate stack 20. The peripheral edge 45 of each conductor bar 40 projects through the open portions 29 of the grooves 28 on the periphery 25 along the main portion 44, and further projects along the first and second portions 42 and 46.

Each of the annular-shaped shorting end rings 30 is preferably fabricated from aluminum-based materials and has a plurality of shorting end ring grooves 32 that correspond to the grooves 28 of the laminate stack 20. Alternatively, the shorting end rings 30 may be fabricated from copper-based materials. The shorting end ring grooves 32 are designed to accommodate one of the first and second portions 42, 46 of the conductor bars 40, preferably by a slip fit. Each shorting end ring 30 is assembled onto an end of the laminate stack 20 by inserting one of the first and second portions 42, 46 of the conductor bars 40 into the shorting end ring grooves 32. The shorting end ring grooves 32 are designed to have a slightly larger cross-section than the first and second portions 42, 46 of the conductor bars 40 for ease of assembly, thus forming voids 34 therebetween. The first and second portions 42, 46 of the conductor bars 40 may also be designed with a slight taper towards an outer end for ease of manufacturing and assembly. A wetting agent 36, e.g., solder flux material, may be applied to each of the first and second portions 42, 46 of the conductor bars 40. When the shorting end rings 30 are assembled onto the steel laminate stack 20, the first and second portions 42, 46 of the conductor bars 40 preferably project through the shorting end ring grooves 32 and are flush with the outer ends of the shorting end rings 30. Preferably, the wetting agent 36 fills substantial portions of the voids 34 prior to undergoing a manufacturing process to join the shorting end rings 30 to the conductor bars 40.

FIG. 2 shows the rotor assembly 10 oriented for immersion in a bath 50 containing a liquefied or molten metal 52. The molten metal 52 is preferably an electrically conductive solder material suitable for joining copper to copper, aluminum to copper, or aluminum to aluminum, depending upon the selected materials for the conductor bars 40 and the shorting end rings 30. As shown, the rotor assembly 10 is oriented vertically, with the second end 16 oriented for immersing into the molten metal 52 in the bath 50. A compressive load is applied to the first and second ends 14, 16 of the rotor assembly 10 prior to immersing the rotor assembly 10 in the bath 50, the compressive load maintained on the rotor assembly 10 during the immersion thereof.

The manufacturing process to join the shorting end rings 30 to the conductor bars 40 for the rotor assembly 10 includes immersing the first end 14 and subsequently immersing the second end 16 of the rotor assembly 10 into the bath 50 containing molten metal 52. The action of immersing the first end 14 and the second end 16 of the rotor assembly 10 into the molten metal 52 in the bath 50 exposes each of the first and second portions 42, 46 of the conductor bars 40 that project through the shorting end ring grooves 32 of the shorting end ring 30 to the molten metal 52. Wicking and capillary action of the molten metal 52 supplants the wetting agent 36 and fills the voids 34 to create a structural and an electrical connection. In addition to or in place of the wetting agent 36, the rotor assembly 10 may be preheated to facilitate wetting and decrease cycle time for the immersion process. A flow mechanism, e.g., ultrasonic vibration, may be employed to facilitate wetting and decrease cycle time for the immersion process. The manufacturing process combines the plurality of conductor bars 40 and the first and second shorting end rings 30 into a unitary structure both electrically and mechanically. Subsequent to immersing the first end 14 and immersing the second end 16 of the rotor assembly 10 into the molten metal 52, a post-immersion machining process may be employed to remove excess molten metal 52 and rotationally balance the rotor assembly 10.

The manufacturing process facilitates use of copper-based materials for either or both the shorting end rings 30 and conducting bars 40 of the rotor assembly 10. Copper is desirable to improve power density and heat transfer as compared to other materials, e.g., aluminum-based materials.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for fabricating a rotor assembly for an induction motor, comprising:
    assembling first and second shorting end rings onto a plurality of conductor bars of a steel laminate stack, the first and second shorting end rings each including a plurality of grooves aligned with corresponding first portions of the conductor bars extending from a first end of the steel laminate stack and corresponding second portions of the conductor bars extending from a second end of the steel laminate stack and each of the conductor bars having a taper towards an outer end of the first portion and a taper towards an outer end of the second portion, the assembling including:
        applying a wetting agent onto one of:
            the first and second portions of each of the plurality of conductor bars; and
            the grooves of the first and second shorting end rings;
        inserting the corresponding first portions of the conductor bars into the grooves of the first shorting end ring such that the tapered outer ends of the first portions of the conductor bars project through the shorting end ring grooves and are flush with an outer end of the first shorting end ring, and inserting the corresponding second portions of the conductor bars into the grooves of the second shorting end ring such that the tapered outer ends of the second portions of the conductor bars project through the shorting end ring grooves and are flush with an outer end of the second shorting end ring, wherein inserting the corresponding first and second portions of the conductor bars into the grooves of the first and second shorting end rings is done such that the wetting agent fills voids between the grooves of the first and second shorting end rings and the corresponding portions of the tapered outer ends of the conductor bars; and
    joining the shorting end rings to the plurality of conductor bars solely by a molten metal bath process including:

immersing the first and second ends of the steel laminate stack including the assembled first and second shorting end rings into a bath containing molten metal such that the molten metal supplants the wetting agent in the voids and joins the first and second shorting end rings to the corresponding first and second portions of the conductor bars; and employing ultrasonic vibration to facilitate wetting and decrease cycle time for the immersion process.

2. The method of claim 1, wherein applying a wetting agent onto one of the first and second portions of each of a plurality of conductor bars and the grooves of the first and second shorting end rings comprises applying the wetting agent onto surfaces of the first and second portions of the conductor bars prior to inserting the corresponding first portions of the conductor bars into the plurality of grooves of the first shorting end ring and inserting the corresponding second portions of the conductor bars into the grooves of the second shorting end ring.

3. The method of claim 1, wherein applying a wetting agent onto one of the first and second portions of each of a plurality of conductor bars and the grooves of the first and second shorting end rings comprises applying the wetting agent onto the grooves of the first and second shorting end rings prior to inserting the corresponding first portions of the conductor bars into the grooves of the first shorting end ring and inserting the corresponding second portions of the conductor bars into the grooves of the second shorting end ring.

4. The method of claim 1, wherein the molten metal bath process further includes preheating the assembled first and second shorting end rings prior to immersing the first and second ends of the steel laminate stack including the assembled first and second shorting end rings into the bath containing molten metal.

5. The method of claim 1, wherein the conductor bars comprise copper.

6. The method of claim 5, wherein the first and second shorting end rings comprise copper.

7. The method of claim 5, wherein the first and second shorting end rings comprise aluminum.

8. The method of claim 1, wherein the first and second shorting end rings comprise aluminum.

9. The method of claim 1, wherein the molten metal bath process further includes applying a compressive load to first and second ends of the rotor assembly during the immersing of the first and second ends of the steel laminate stack including the assembled first and second shorting end rings into the bath containing molten metal.

10. A method for fabricating a rotor for an induction motor, comprising:

inserting a plurality of copper conductor bars in a corresponding plurality of grooves of a steel laminate stack, each conductor bar including a first portion extending from a first end of the steel laminate stack, a main portion extending through the corresponding groove of the steel laminate stack, and a second portion extending from a second end of the steel laminate stack, and each of the copper conductor bars having a taper towards an outer end of the first portion and a taper towards an outer end of the second portion;

assembling first and second aluminum shorting end rings onto the first and second ends of the steel laminate stack, the first and second aluminum shorting end rings each including a plurality of grooves aligned with corresponding first portions of the copper conductor bars extending from the first end of the steel laminate stack and corresponding second portions of the copper conductor bars extending from the second end of the steel laminate stack, the assembling comprising:

applying a wetting agent onto one of:
the first and second portions of each of the plurality of conductor bars; and
the grooves of the first and second shorting end rings;

inserting the corresponding first portions of the copper conductor bars into the grooves of the first aluminum shorting end ring such that the tapered outer ends of the first portions of the copper conductor bars project through the aluminum shorting end ring grooves and are flush with an outer end of the first aluminum shorting end ring, inserting the corresponding second portions of the conductor bars into the grooves of the second aluminum shorting end ring such that the tapered outer ends of the second portions of the copper conductor bars project through the aluminum shorting end ring grooves and are flush with an outer end of the second aluminum shorting end ring;

wherein inserting the corresponding first and second portions of the conductor bars into the grooves of the first and second shorting end rings is done such that the wetting agent fills voids between the grooves of the first and second shorting end rings and the corresponding portions of the tapered outer ends of the conductor bars; and joining the shorting end rings to the plurality of conductor bars solely by a molten metal bath process including:

introducing molten solder in a bath containing molten solder into the voids formed between the grooves of the aluminum shorting end rings and the corresponding portions of the tapered outer ends of the copper conductor bars, supplanting the wetting agent and joining the first and second aluminum shorting end rings to the corresponding first and second portions of the copper conductor bars; and employing ultrasonic vibration to facilitate wetting and decrease cycle time for the process of introducing molten solder.

11. The method of claim 10, wherein introducing molten solder into the voids formed between the aluminum shorting end rings and the corresponding portions of the copper conductor bars further comprises inserting the first end of the steel laminate stack having the assembled first aluminum shorting end ring into the bath containing molten solder and inserting the second end of the steel laminate stack having the assembled second aluminum shorting end ring into the bath containing molten solder.

12. The method of claim 11, wherein applying a wetting agent onto one of the first and second portions of each of a plurality of conductor bars and the grooves of the first and second shorting end rings comprises applying the wetting agent onto at least one of the surfaces of the first and second portions of the copper conductor bars and the grooves of the first and second aluminum shorting end rings prior to inserting the corresponding first portions of the copper conductor bars into the grooves of the first aluminum shorting end ring and inserting the corresponding second portions of the copper conductor bars into the grooves of the second aluminum shorting end ring.

13. The method of claim 10, wherein the molten metal bath process further includes preheating the assembly comprising the first and second aluminum shorting end rings and the steel laminate stack prior to introducing molten solder into the voids formed between the aluminum shorting end rings and the corresponding portions of the copper conductor bars.

14. A method for fabricating a rotor for an induction motor, comprising:
forming a plurality of copper conductor bars in a plurality of grooves of a steel laminate stack, each copper conductor bar including a respective first portion extending from a first end of the steel laminate stack, a main portion extending through a respective one of the plurality of grooves of the steel laminate stack, and a respective second portion extending from a second end of the steel laminate stack and each of the copper conductor bars having a taper towards an outer end of the first portion and a taper towards an outer end of the second portion;
assembling first and second shorting end rings onto the first and second ends of the steel laminate stack, the first and second shorting end rings each including a plurality of grooves aligned with corresponding first portions of the copper conductor bars extending from the first end of the steel laminate stack and corresponding second portions of the copper conductor bars extending from the second end of the steel laminate stack, the assembling comprising:
applying a wetting agent onto one of:
the first and second portions of each of the plurality of copper conductor bars; and
the plurality of grooves of the first and second shorting end rings;
inserting the corresponding first portions of the copper conductor bars into the grooves of the first shorting end ring such that the tapered outer ends of the first portions of the copper conductor bars project through the first shorting end ring grooves and are flush with an outer end of the first shorting end ring and inserting the corresponding second portions of the copper conductor bars into the grooves of the second shorting end ring such that the tapered outer ends of the second portions of the copper conductor bars project through the second shorting end ring grooves and are flush with an outer end of the second shorting end ring, wherein inserting the corresponding first and second portions of the conductor bars into the grooves of the first and second shorting end rings is done such that the wetting agent fills voids between the grooves of the first and second shorting end rings and the corresponding portions of the tapered outer ends of the conductor bars; and
joining the shorting end rings to the plurality of conductor bars solely by a molten metal bath process including:
immersing the first and second shorting end rings assembled onto the first and second ends of the steel laminate stack into a bath of molten solder such that the molten solder supplants the wetting agent and joins the first and second shorting end rings to the corresponding tapered outer ends of the first and second portions of the conductor bars; and
employing ultrasonic vibration to facilitate wetting and decrease cycle time for the immersion process.

15. The method of claim 14, further comprising executing a post-immersion machining process to remove excess solder.

16. The method of claim 14, further comprising executing a post-immersion machining process to rotationally balance the rotor.

* * * * *